United States Patent [19]

Takiguchi et al.

[11] Patent Number: 4,797,747
[45] Date of Patent: Jan. 10, 1989

[54] STREAK CAMERA DEVICE HAVING A PLURALITY OF STREAK TUBES

[75] Inventors: Yoshihiro Takiguchi; Yutaka Tsuchiya, both of Shizuoka, Japan

[73] Assignee: Hamamatsu Photonics Kabushiki Kaisha, Shizuoka, Japan

[21] Appl. No.: 21,228

[22] Filed: Mar. 3, 1987

[30] Foreign Application Priority Data

Mar. 4, 1986 [JP] Japan ............................ 61-46579

[51] Int. Cl.$^4$ ............................................ H04N 3/18
[52] U.S. Cl. .................................. 358/217; 358/209; 250/213 VT
[58] Field of Search ............... 358/217, 209, 222, 218, 358/219; 250/213 VT

[56] References Cited

U.S. PATENT DOCUMENTS

| | | | |
|---|---|---|---|
| 2,976,358 | 3/1961 | Haines | 358/209 |
| 4,318,124 | 3/1982 | Nakamura et al. | 358/51 |
| 4,668,977 | 5/1987 | Ohno et al. | 358/64 |

Primary Examiner—Jin F. Ng
Assistant Examiner—Stephen Brinich
Attorney, Agent, or Firm—Finnegan, Henderson, Farabow, Garrett, & Dunner

[57] ABSTRACT

A streak camera device comprising plural streak tubes generating a plurality of tube outputs for simultaneous measurement of a plurality of separate characteristics of a light emissions, the plural streak tubes forming electron beams in response to the light emission; a deflecting signal generating device including only a single deflecting signal generating device generating a deflection output for simultaneously deflecting the beams of the plural streak tubes; and a device for recording the tube outputs of the streak tubes.

11 Claims, 3 Drawing Sheets

STREAK CAMERA DEVICE HAVING A PLURALITY OF STREAK TUBES

BACKGROUND OF THE INVENTION

1. Field of the Invention

This invention relates to a streak camera device in which a plurality of streak tubes are driven by the output signal of a single deflecting signal generator, so that the same phenomenon can be analyzed in many aspects.

2. Description of the Background Art

A streak camera is a device for converting time information from a luminous event into spatial information. That is, such a camera can measure the variatin in intensity distribution of a light emission which changes at high speed.

A typical streak camera comprises a streak tube which is an electron tube. In the electron tube, a photocathode and a phosphor screen are arranged, and a pair of deflecting electrodes are disposed therebetween.

When a light beam is applied to the photocathode of the streak tube, the photocathode emits photoelectrons in accordance with changes of the incident light beam over time, thus forming a photoelectron beam which changes with time.

When the photoelectron beam is passed through the electric field formed by the deflecting electrodes while advancing towards the phosphor screen, it is caused to sweep the phosphor screen in one direction. As a result, the change in intensity of the incident light beam appears as a change in luminance of the photoelectron beam in the direction of sweep (i.e., the direction of time axis) on the phosphor screen. This is a so-called "streak image". The streak image is photographed with a camera or detected with a TV (television) camera, so that the distribution of brightness of the output image in the direction of sweep is quantized for measurement of the change in intensity of the light beam. There has been a strong demand for observing an optical phenomenon simultaneously in a plurality of different aspects with such a streak camera.

For instance, in a case where the above optical phenomenon is a luminous phenomenon including a fluorescence having a wide band of wavelengths, in order to measure the attenuation characteristics of respective wavelengths of the fluorescence excited by a laser beam or the like, a method has been proposed and practiced in the art in which a sepctroscope is provided between the streak tube and the light source, and the fluorescence is applied through the spectroscope to the photocathode of the streak tube thereby to disperse the wavelengths. FIG. 7 shows a conventional streak camera including a spectroscope. In FIG. 7, the light beam emitted from the light source 300 is dispersed by the spectroscope 310 and applied to the photocathode 110 of the streak tube 100 in a direction perpendicular to the time axis direction. When the streak tube 100 is operated, the resultant output image is as shown in FIG. 8. As is shown, in the effective output surface, the streak images of various wavelengths ($\lambda_1$ through $\lambda_n$) are arranged substantially in parallel with the time axis.

According to the above-described method, in the wavelength region to which the photocathode of the streak tube is sensitive, the attenuation characteristics of a number of fluorescent rays of different wavelengths can be measured.

However, the method cannot be applied to the measurement of the attenuation characteristics of fluorescent rays whose wavelengths are outside the aforementioned particular wavelength region in which the photocathode of the streak tube is sensitive.

In order to overcome this difficulty, the present inventors have used a method in which at least two streak camera devices having streak tubes whose photocathodes are sensitive to different wavelength regions are operated in a parallel mode. However, even if the two streak camera devices are driven by one trigger signal, the output images of the streak camera devices suffer from irregular time fluctuation of several tens of picoseconds because of the jitters of the respective deflecting signal generators. Therefore, the.resultant data are rather difficult to adjust.

Accordingly, an object of this invention is to provide a streak camera device in which the abovedescribed difficulties accompanying a conventional streak camera device have been eliminated. It is a further object of the invention to utilize a plurality of streak tubes to measure one and the same phenomenon in a plurality of aspects.

SUMMARY OF THE INVENTION

The foregoing object of the invention has been achieved by the provision of a streak camera device which, according to the invention, comprises: plural streak tube means generating a plurality of tube outputs for simultaneous measurement of a plurality of separate characteristics of a light emission, the plural streak tube means forming electron beams in response to the light emission; deflecting signal generating means including only a single deflecting signal generating device generating a deflection output for simultaneously deflecting the beams of the plural streak tube means; and means for recording the tube outputs of the streak tube means.

It is preferred that the deflecting signal generating means include output applying means for simultaneously applying the output of the signal generating device to the plural streak tube means.

It is also preferred that the plural streak tube means include at least two streak tubes, each including a pair of deflecting electrodes, and having a deflection sensitivity. The deflection output may be a ramp voltage, and the deflection output may be supplied to one of the pair of deflecting electrodes of each streak tube. Alternatively, the deflection output may include a plurality of ramp voltages, and the deflection output may be differentially applied to both of the pair of deflecting electrodes of each streak tube.

Preferably, the output applying means includes means for compensating for the deflection sensitivities of the streak tubes. It is also preferred that each tube has a corresponding deflection center shift and a photoelectrons transit time, and that the output applying means also include means for correcting the deflection center shift and the photoelectron transit time of the tubes. Each tube preferably includes a photocathode, with the photocathode of each different tube being sensitive to a different wavelength region. Alternatively, the photocathode of each tube may be sensitive to substantially the same wavelength region, and the streak tubes may be oriented for receiving light emissions from different directions from a single light source. At least one of the streak tubes may be responsive to corpuscular rays other than optional rays.

BRIEF DESCRIPTION OF THE DRAWINGS

The accompanying drawings, which are incorporated in and constitute a part of the specification, illustrate an embodiment of the invention and, together with the description, serve to explain the principles of the invention.

Of the drawings.

DETAILED DESCRIPTION OF THE PREFERRED EMBODIMENT

This invention will be described with reference to the accompanying drawings in more detail. In accordance with the invention, the streak camera device comprises plural streak tube means generating a plurality of tube outputs for simultaneous measurement of a plurality of separate characteristics of a light emission, the plural streak tube means forming electron beams in response to the light emission; deflecting signal generating means including only a single deflecting signal generating device generating a deflection output for simultaneously deflecting the beams of the plural streak tube means; and means for recording the tube outputs of the streak tube means.

Figure 1:
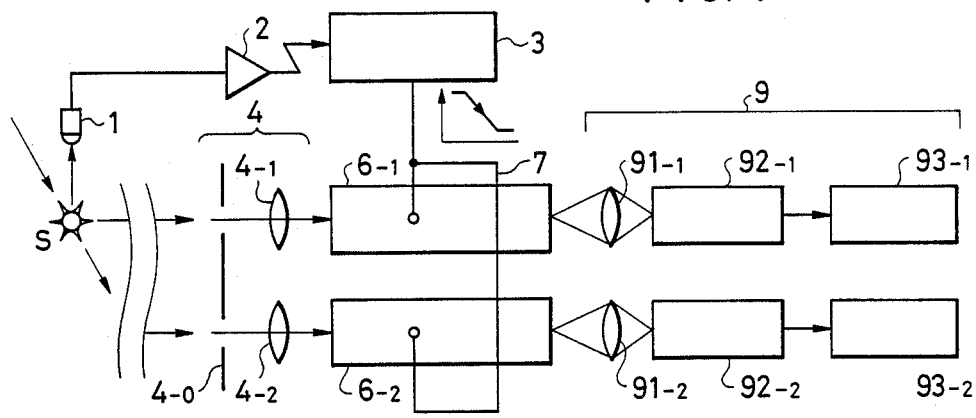
FIG. 1 is a block diagram showing a first example of a streak camera device according to this invention.

FIG. 1 is a block diagram showing a first example of a streak camera device according to the invention. A light beam S emitted from an object to be measured is applied simultaneously to the photocathodes of streak tubes 6-1 and 6-2 through emitted-light-beam applying means 4. The emitted-light-beam applying means 4 comprises a slit board 4-0 and lenses 4-1 and 4-2, which form the images of light beams passed through the slits of the board 4-0 on the photocathodes of the streak tubes 6-1 and 6-2. The light beam from the light emitting source is detected by a photo-diode 1, the output of which is amplified by a high-speed amplifier 2 and applied, as a trigger signal, to a deflecting signal generator 3.

The output of the deflecting signal generator 3 is applied to the streak tubes 6-1 and 6-2 through connecting means 7. The photocathodes of the streak tubes 6-1 and 6-2 are different from each other in their range of wavelength.

Figure 3:
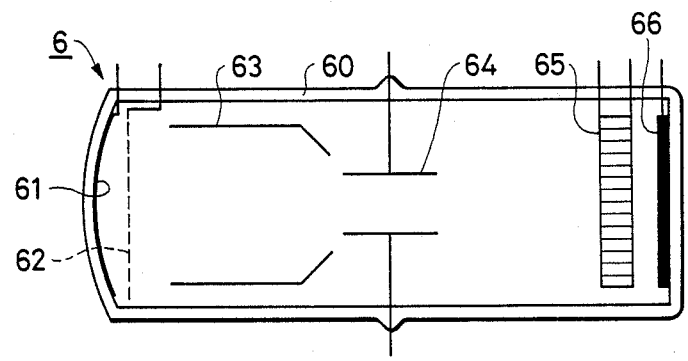
FIG. 3 is a sectional view showing the structure of a streak tube in the device shown in FIG. 1.

The fundamental structure and the operation of a streak tube will be described with reference to FIG. 3. The streak tube is an electron tube which, as shown in FIG. 3, comprises a cylindrical vacuum container 60; a photocathode 61 and a phosphor screen 66 formed on the inner surfaces of both ends of the cylindrical vacuum container 60; and a mesh electrode 62, a focusing electrode 63, a pair of deflecting electrodes 64 and a micro-channel plate 65 arranged in the vacuum container 60 in the stated order as viewed from the photocathode 61.

Electrons emitted from the photocathode 61 are deflected by the ramp deflecting electric field formed by the deflecting electrodes 64, and are multiplied by the micro-channel plate, so that they are applied to the phosphor screen 66 in the order of emission.

Figure 2:
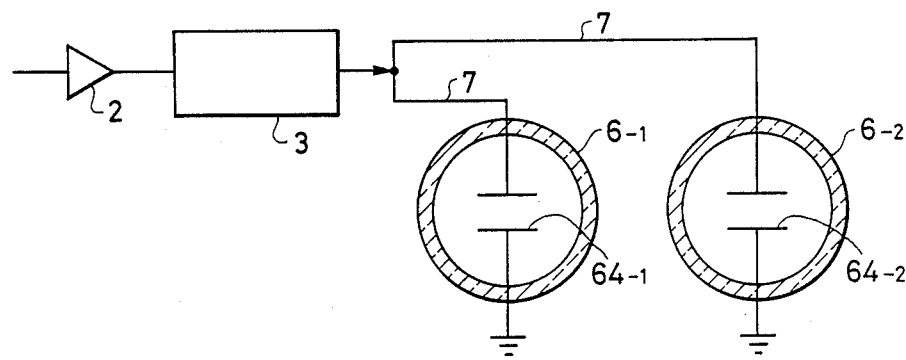
FIG. 2 is an explanatory diagram showing one example of the application of a deflecting signal to streak tubes through connecting means in the device shown in FIG. 1.

The output of the deflecting signal generator 3, as shown in FIG. 2, is applied simultaneously through the connecting means 7 to the deflecting electrodes 64-1 and 64-2 of the streak tubes 6-1 and 6-2, so that the tubes 6-1 and 6-2 form deflecting fields. Therefore, the streak images attributing to the electrons deflected by the same deflecting signal are formed on the phosphor screens of the streak tubes. The ramp voltage provided by the deflecting signal generator 3 may be a linear part of a sinusoidal voltage.

The streak images thus formed are directed to the units 9 for recording the outputs of the streak tubes for comparison. In the units 9, image pickup lenses 91-1 and 91-2 are used to form the images of the phosphor screens of the streak tubes 6-1 and 6-2 on the photocathodes of image-pickup tubes 92-1 and 92-2, respectively. The outputs of the image pickup tubes 92-1 and 92-2 are recorded in image memories 93-1 and 93-2, which are made up of frame memories.

Figure 4:
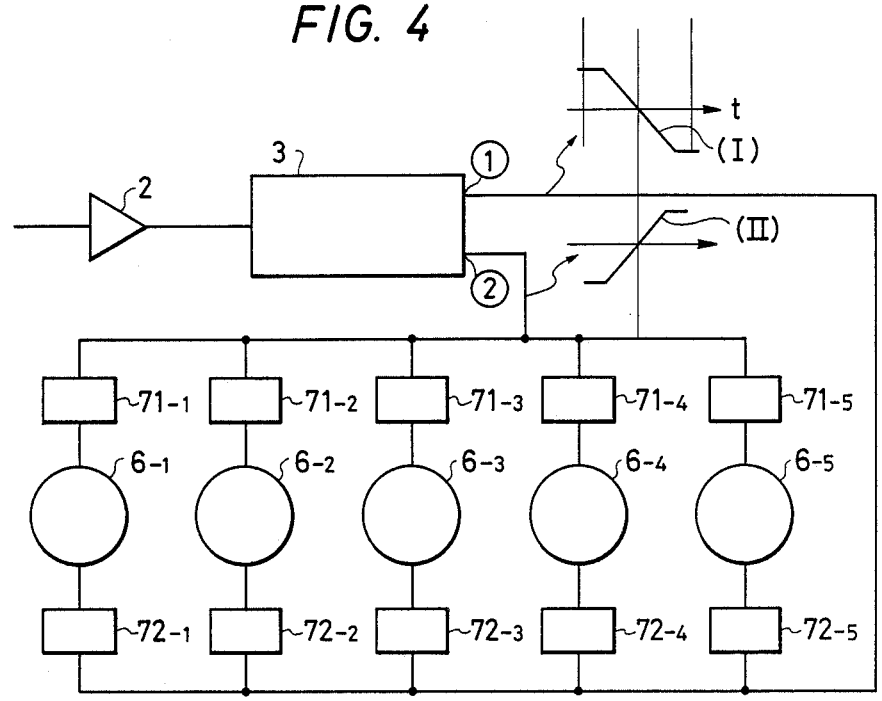
FIG. 4 is a block diagram showing a second example of the streak camera device according to the invention.

FIG. 4 is a block diagram showing a second example of the streak camera device according to the invention. In the streak camera device of FIG. 4, five streak tubes 6-1 through 6-5 are driven by the output signal of a single deflecting signal generator 3.

The photocathodes of the streak tubes 6-1 through 6-5 are sensitive to an X-ray region, far ultraviolet ray region, near ultraviolet ray region, visible ray region, and infrared ray region, respectively.

In response to the trigger signal, the deflecting signal generator 3 provides a signal having a waveform as indicated by (I) in FIG. 4 at its terminal (1), and a signal having a waveform as indicated by (II) in FIG. 4 at its terminal (2). These signals are applied to the pairs of deflecting electrodes in the streak tubes 6-1 through 6-5 through deflection timing and deflection sweep speed adjusting circuits 71-1 through 71-5, and 72-1 through 72-5, respectively.

The deflection timing and deflection sweep speed adjusting circuits have deflection adjusting circuits made up of high-withstanding-voltage high-frequency cables. The lengths of the cables are adjusted to adjust the timing of the streak images, and the timing of the deflecting signals (I) and (II) for the streak tubes.

Figure 5:
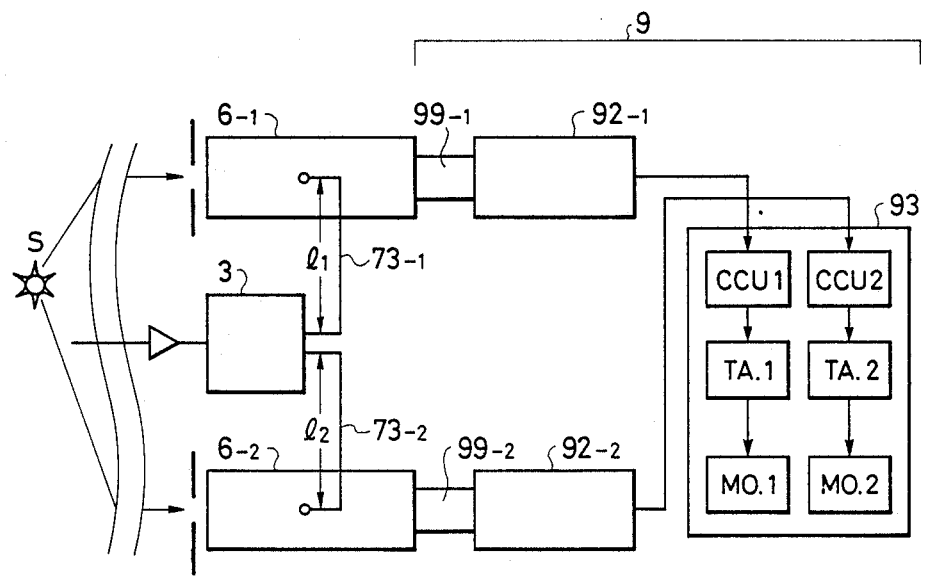
FIG. 5 is a block diagram showing a third example of the streak camera device according to the invention.

FIG. 5 is a block diagram showing a third example of the streak camera device according to the invention. In the streak camera device of FIG. 5, a streak tube 6-1 has a photocathode which is provided according to photoelectric standard S-20 of the US Electronic Industries Association, and a streak tube 6-2 has a photocathode which is provided according to the photo-electric standard S-1 of the same association. The streak tube 6-1 is sensitive to light beams of 300 nm to 800 mn in wavelength, and the streak tube 6-2 is sensitive to light beams of 300 nm to 1.1 $\mu$m.

The streak tubes may be N1357 streak tubes with the photocathodes or specified above, which are manufactured by Hamamatsu Photonics Kabushiki Kaisha in Japan.

The output of a deflecting signal generator 3 is applied to the deflecting electrodes of the streak tubes 6-1 and 6-2, respectively, through connecting means, namely, coaxial cables 73-1 and 73-2.

The coaxial cables 73-1 and 73-2 act as a kind of delay means. The lengths $l_1$ and $l_2$ of the coaxial cables 73-1 and 73-2 are adjusted so that the difference in transit time between the photoelectrons in the streak tubes and the difference between the deflection centers of the streak tubes are adjusted so that the streak images formed on the phosphor screens are correctly in correspondence with each other. The streak images formed on the phosphor screens of the streak tubes 6-1 and 6-2 are applied through image coupling means 99-1 and 99-2, which are made up of fiber plate, to the photocathodes of SIT (silicon intensified target) vidicon cameras 92-1 and 92-2, respectively. The outputs of the SIT vidicon cameras 92-1 and 92-2 are applied to an image processing block 93 in a streak tube output recording unit 9.

The SIT cameras C1000-18 manufactured by the aforementioned Hamamatsu Photonics K. K. can be used as the SIT vidicon camera 92-1 and 92-2.

In FIG. 5, reference characters CCU1 and CCU2 designate camera control units, each operating as a drive power source for the SIT camera, for generating a video synchronizing signal and amplifying a video signal. The output video signals of the camera control units CCU1 and CCU2 are applied to devices TA1 and TA2, respectively, which process the signals and output the results of the processing.

More specifically, the devices TA1 and TA2 are operatively coupled to frame memories adapted to store the streak images, to analyze the data in the frame memories for correcting the intensities and the time axis of the output images and for correcting the wavelength axis (or spatial axis). The output data of the devices TA1 and TA2, and the streak images are displayed on display units MO1 and MO2 respectively.

In the above-described examples of the streak camera device according to the invention, the time-resolved measurement in the range from a visible ray region to an infrared ray region of the light beam emitted from the light source S can be achieved with a time resolution of about 2 ps and with the difference in time between the output images being 1 ps or less.

If spectroscopes are arranged in front of the streak tubes 6-1 and 6-2, respectively, so that a spread light beam 300 nm to 800 nm in wavelength is applied to the streak tube 6-1, while a spread light beam 800 nm to 1.3 μm in wavelength is applied to the streak tube 6-2, then the time-resolved spectroscopic measurement of rays 300 nm to 1.3 μm in wavelength can be achieved simultaneously.

Figure 6:
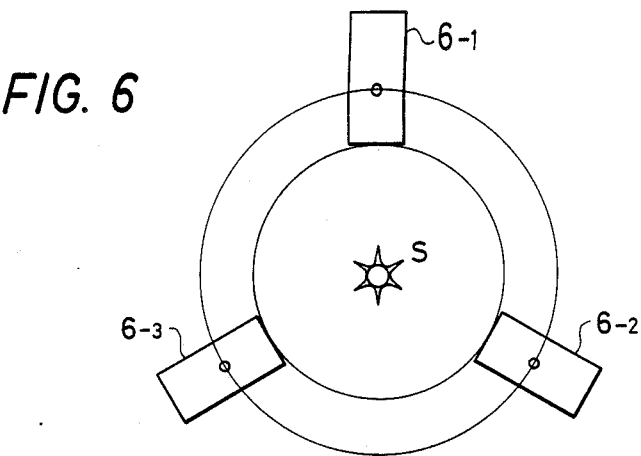
FIG. 6 is an explanatory diagram showing one example of the arrangement of streak tubes for measuring a light beam in a plurality of directions.
Figure 7:
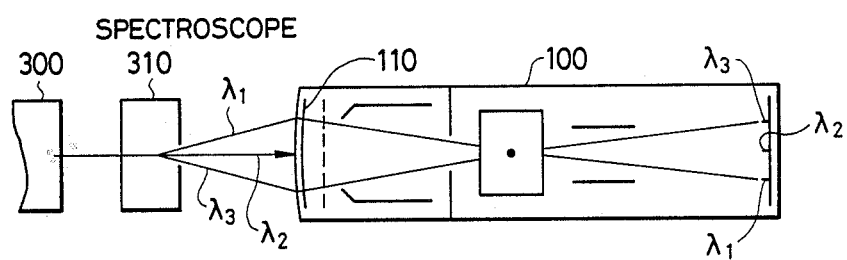
FIG. 7 is a block diagram of a conventional streak camera having a spectroscope.
Figure 8:
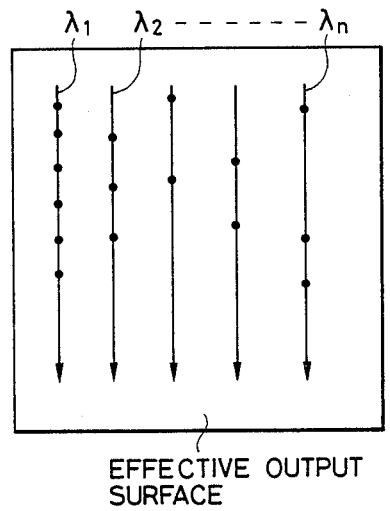
FIG. 8 is a streak image of the conventional streak camera, as shown in FIG. 7.

FIG. 6 is a diagramatic view showing one example of an arrangement of streak tubes for measuring in a plurality of directions a light beam emitted from a light source. The streak tube arrangement as shown in FIG. 6 is effective in measuring a light beam in several directions where the emitted light is directional or it is unknown whether the emitted light is directional.

In the embodiment of FIG. 6, three streak tubes 6-1, 6-2 and 6-3 are so arranged as to surround a light source S. One example of the light source S is a fuel pellet in laser nuclear fusion. A trigger signal provided in synchronization with a laser beam is applied to a deflector, and the deflecting signal of the latter is applied to the streak tubes so that the light from the fuel pellet can be measured in three directions simultaneously.

Accordingly, a spatial variation with time such as the implosion of the fuel pellet can be measured with a high time accuracy of 1 ps or less.

As is apparent from the above description, the streak camera device according to the invention is superior to the conventional one in performance. That is, light can be measured with more than one streak tube simultaneously.

In the conventional system in which the streak tubes are driven by a plurality of deflecting signal generating means, the time accuracy is of the order of about ±20 ps. On the other hand, in the streak camera device of the invention, the time accuracy is as high as ±1 ps.

Various modifications and variations may be made in the invention without departing from the scope or spirit of the invention.

What is claimed is:

1. A streak camera device, comprising:
   plural streak tube means generating a plurality of tube outputs for simultaneous measurement of a plurality of separate characteristics of a light emission, the plural streak tube means forming electron beams in response to the light emission;
   deflecting signal generating means including only a single deflecting signal generating device generating a deflection output for simultaneously deflecting the corresponding respective beams of the plural streak tube means; and
   means for recording the tube outputs of the streak tube means.

2. The device of claim 1 wherein the deflecting signal generating means includes output applying means for simultaneously applying the output of the signal generating device to the plural streak tube means.

3. The device of claim 2 wherein the plural streak tube means includes at least two streak tubes, each including a pair of deflecting electrodes and each having a characteristic deflection sensitivity.

4. The device of claim 3 wherein the deflection output is a ramp voltage, and the deflection output is supplied to one of the electrodes, of each of said pairs of deflecting electrodes of corresponding streak tubes.

5. The device of claim 3 wherein the deflection output includes a plurality of ramp voltages, and the deflection output is differentially applied to both electrodes of the pair of deflecting electrodes of each streak tube.

6. The device of claim 3 wherein the output applying means includes means for compensating for the deflection sensitivities of the streak tubes.

7. The device of claim 6 wherein each tube has corresponding deflection center shift and photoelectron transit time, and the output applying means also includes means for correcting the deflection center shift and the photoelectron transit time of the tubes.

8. The device of claim 3 wherein each tube includes a photocathode, and the photocathode of each different tube is sensitive to a different wavelength region.

9. The device of claim 3 wherein each tube includes a photocathode, and the photocathode of each tube is sensitive to substantially the same wavelength region, the streak tubes being oriented for receiving light emissions from different directions from a single light source.

10. The device of claim 3 wherein at least one of the streak tubes is responsive to corpuscular rays other than optical rays.

11. The device of claim 1 further including a means for detecting an emission phenomenon and for generating a trigger signal in synchronization with said emission phenomenon wherein said deflecting signal generator is activated in response to said trigger signal.

* * * * *